US010636303B2

(12) United States Patent
Masuike et al.

(10) Patent No.: US 10,636,303 B2
(45) Date of Patent: Apr. 28, 2020

(54) ELECTRONIC DEVICE, METHOD OF COMMUNICATION, AND NON-TRANSITORY COMPUTER READABLE STORAGE MEDIUM (71) Applicant: KYOCERA Corporation, Kyoto (JP)

(72) Inventors: Isao Masuike, Machida (JP); Hideki Morita, Yokohama (JP); Koutaro Yamauchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/279,468

(22) Filed: Feb. 19, 2019

(65) Prior Publication Data
US 2019/0180616 A1 Jun. 13, 2019

Related U.S. Application Data (63) Continuation of application No. PCT/JP2017/029593, filed on Aug. 18, 2017.

(30) Foreign Application Priority Data

Aug. 24, 2016 (JP) .................. 2016-163783

(51) Int. Cl.
G08G 1/0965 (2006.01)
G08G 1/09 (2006.01)
H04M 1/00 (2006.01)
H04W 4/38 (2018.01)
H04W 4/46 (2018.01)
H04W 4/44 (2018.01)

(52) U.S. Cl.
CPC ............. *G08G 1/0965* (2013.01); *G08G 1/09* (2013.01); *H04M 1/00* (2013.01); *H04W 4/38* (2018.02); *H04W 4/44* (2018.02); *H04W 4/46* (2018.02)

(58) Field of Classification Search
None
See application file for complete search history.

(56) References Cited

U.S. PATENT DOCUMENTS 6,253,133 B1 * 6/2001 Sakai ................ B60R 21/01532
180/268
6,728,616 B1 * 4/2004 Tabe .................... B60R 21/017
180/268
7,357,452 B2 * 4/2008 Pollack ................ B60N 2/2863
297/219.1

(Continued)

FOREIGN PATENT DOCUMENTS

JP 2007-179573 A 7/2007
JP 2008-158578 A 7/2008

(Continued)

Primary Examiner — Fekadeselassie Girma
(74) Attorney, Agent, or Firm — Studebaker & Brackett PC (57) ABSTRACT An electronic device included in a first vehicle comprises a first communication unit communicating with a second vehicle other than the first vehicle or a roadside unit, a second communication unit communicating with first vehicle, and at least one processor. The at least one processor transmits information of a passenger of the first vehicle to the second vehicle or the roadside unit by a communication via the first communication unit when it is determined based on a communication via the second communication unit that a power engine of the first vehicle is not activated.

9 Claims, 5 Drawing Sheets (56) References Cited

U.S. PATENT DOCUMENTS

| | | | |
|---|---|---|---|
| 10,189,352 B2* | 1/2019 | Virgilio | B60K 28/02 |
| 10,384,564 B1* | 8/2019 | Zhanel | B60N 2/002 |
| 2002/0157883 A1* | 10/2002 | Ogata | B60K 6/46 |
| | | | 180/65.245 |
| 2004/0100360 A1* | 5/2004 | Chandebois | B60R 25/24 |
| | | | 340/5.72 |
| 2004/0113797 A1* | 6/2004 | Osborne | B60N 2/002 |
| | | | 340/573.4 |
| 2006/0103516 A1* | 5/2006 | Zang | B60N 2/002 |
| | | | 340/457 |
| 2006/0208911 A1* | 9/2006 | Davis | B60N 2/002 |
| | | | 340/573.4 |
| 2010/0274414 A1* | 10/2010 | Park | B60W 30/06 |
| | | | 701/2 |
| 2012/0065858 A1* | 3/2012 | Nickolaou | B60Q 9/008 |
| | | | 701/70 |
| 2013/0093585 A1* | 4/2013 | Ambani | A42B 3/0413 |
| | | | 340/475 |
| 2014/0052345 A1* | 2/2014 | Tobin | B60R 16/037 |
| | | | 701/49 |
| 2014/0253313 A1* | 9/2014 | Schoenberg | B60N 2/28 |
| | | | 340/457 |
| 2014/0300461 A1* | 10/2014 | Stark | G08B 21/02 |
| | | | 340/457 |
| 2015/0035685 A1 | 2/2015 | Strickland et al. | |
| 2015/0327028 A1* | 11/2015 | Zhang | H04W 4/12 |
| | | | 455/452.1 |
| 2016/0148511 A1 | 5/2016 | Shibata et al. | |
| 2016/0152180 A1* | 6/2016 | Kirsch | B60W 40/08 |
| | | | 701/36 |
| 2016/0174010 A1* | 6/2016 | Mohammad | H04R 5/02 |
| | | | 381/302 |
| 2016/0198310 A1* | 7/2016 | Chalmers | H04W 4/40 |
| | | | 455/456.1 |
| 2016/0210833 A1* | 7/2016 | Pinder | G08B 21/02 |
| 2017/0101054 A1* | 4/2017 | Dusane | G08G 1/096716 |
| 2017/0120906 A1* | 5/2017 | Penilla | G05D 1/0011 |
| 2017/0132916 A1* | 5/2017 | Ioli | G08G 1/012 |
| 2017/0148319 A1* | 5/2017 | Reeves | G08G 1/0965 |
| 2017/0162052 A1 | 6/2017 | Sogabe | |
| 2017/0176192 A1* | 6/2017 | Cardoso de Moura | G01C 21/3461 |
| 2017/0282822 A1* | 10/2017 | Hunter, Jr. | B60K 35/00 |
| 2017/0317706 A1* | 11/2017 | Kudo | H04R 1/40 |
| 2018/0098203 A1* | 4/2018 | Schultz | G08G 1/096716 |
| 2018/0105104 A1* | 4/2018 | Smith | B60H 1/00978 |
| 2018/0197352 A1* | 7/2018 | Ganesh | H04W 4/46 |
| 2018/0212935 A1* | 7/2018 | Iyer | H04L 63/061 |
| 2018/0227729 A1* | 8/2018 | Bai | H04W 4/46 |
| 2018/0227765 A1* | 8/2018 | Lei | H04B 1/44 |
| 2018/0232770 A1* | 8/2018 | Miller | G06Q 30/0242 |
| 2018/0253977 A1* | 9/2018 | Oshida | G05D 1/0295 |
| 2019/0096262 A1* | 3/2019 | Dotzler | G08G 1/0965 |
| 2019/0122460 A1* | 4/2019 | Reyes | G07C 5/0808 |
| 2019/0180616 A1* | 6/2019 | Masuike | G08G 1/09 |
| 2019/0187242 A1* | 6/2019 | Shukla | G01S 5/16 |
| 2019/0197497 A1* | 6/2019 | Abari | G06Q 10/20 |
| 2019/0272742 A1* | 9/2019 | Ioli | G08G 1/091 |

FOREIGN PATENT DOCUMENTS

| | | |
|---|---|---|
| JP | 2016-038880 A | 3/2016 |
| JP | 2017-182347 A | 10/2017 |

* cited by examiner

ELECTRONIC DEVICE, METHOD OF COMMUNICATION, AND NON-TRANSITORY COMPUTER READABLE STORAGE MEDIUM

CROSS-REFERENCE TO RELATED APPLICATION

The present application is a continuation based on PCT Application No. PCT/JP2017/029593, tiled on Aug. 18, 2017, which claims the benefit of Japanese Application No. 2016-163783, filed on Aug. 24, 2016. PCT Application No. PCT/JP2017/029593 is entitled "ELECTRONIC DEVICE, CONTROL METHOD, AND CONTROL PROGRAM" and Japanese Application No. 2016-163783 is entitled "ELECTRONIC APPARATUS, CONTROL METHOD, AND CONTROL PROGRAM". The contents of which are incorporated by reference herein in their entirety.

FIELD

The present disclosure relates to electronic devices.

BACKGROUND

There is conventionally an electronic device which can communicate with the other device such as a communication device mounted on a vehicle, a communication device of a passenger of a vehicle, and a roadside unit.

SUMMARY

An electronic device included in a first vehicle according one aspect comprises a first communication unit communicating with a second vehicle, other than the first vehicle, or a roadside unit, a second communication unit communicating with the first vehicle, and at least one processor. The at least one processor determines that a power engine of the first vehicle is not activated based on a communication via the second communication unit, and transmits first information of a passenger of the first vehicle to the second vehicle or to a roadside unit by a communication via the first communication unit.

A method according one aspect is a method of communication of an electronic device in a first vehicle. The method includes at least one processor of the electronic device determining, based on a communication received from the first vehicle via a second communication unit of the electronic device, whether a power engine of the first vehicle is activated, and if the at least one processor determines that the power engine is not activated, transmitting information of a passenger of the first vehicle to a second vehicle or to a roadside unit via a first communication unit of the electronic device.

A non-transitory computer readable storage medium that stores a control program according to one aspect makes an electronic device having a first communication unit included in a first vehicle and communicating with a second vehicle other than the first vehicle or a roadside unit and a second communication unit communicating with the first vehicle execute; determining whether a power engine of the first vehicle is activated based on a communication via the second communication unit; and if it is determined that the power engine is not activated, transmitting information of a passenger of the first vehicle to the second vehicle or the roadside unit by a communication via the first communication unit.

DETAILED DESCRIPTION

Embodiments for implementing an electronic device, a control method, and a control program according to the present disclosure are described in detail with reference to drawings.

A smartphone is described as one example of the electronic device according to the present disclosure hereinafter. The electronic device may be a device other than the smartphone. The electronic device may be, for example, a mobile phone, a tablet, a portable personal computer, a digital camera, a media player, an electronic book reader, a navigator, a pedometer, an activity meter, a wearable device, head-mounted display, a hearing aid, earphones, or a game machine. The wearable device includes a device of watch type, glass type, shoe type, barrette type, key type, necklace type, choker type, ring type, wristband type, and bag type, for example.

Figure 1:
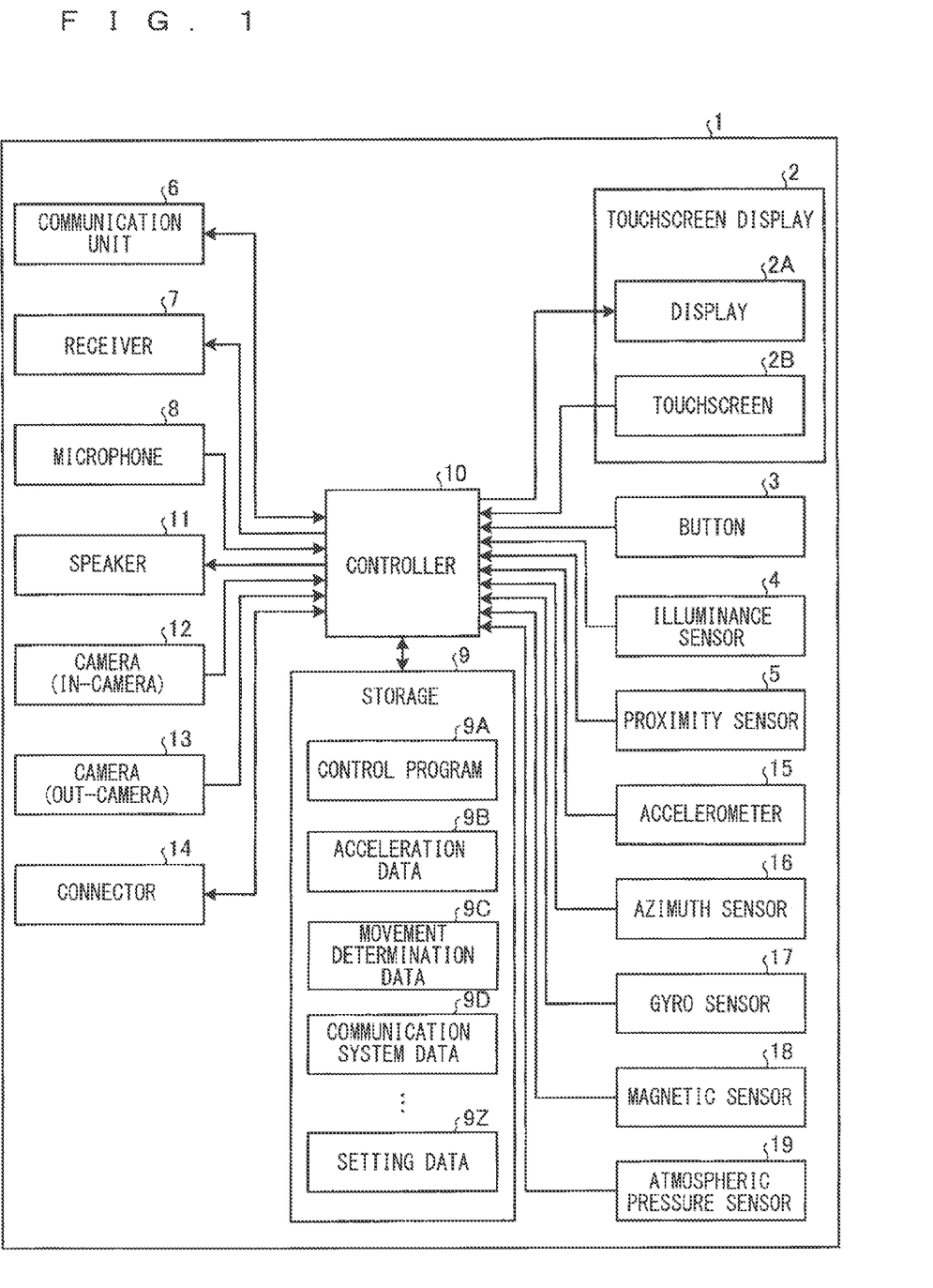
FIG. 1 is a block diagram illustrating one example of a function configuration of a smartphone.

FIG. 1 is a block diagram illustrating one example of a function configuration of a smartphone 1. The same reference numerals may be assigned to the similar constituent element in some cases in the description hereinafter. A repetitive description may be omitted in some cases in the description hereinafter. The smartphone 1 may be referred to as "a subject device" in some cases in the description hereinafter. A vehicle which a user having the smartphone 1 is on may be referred to as "a subject vehicle" in some cases in the description hereinafter.

As illustrated in FIG. 1, the smartphone 1 comprises a touchscreen display 2, a button 3, an illuminance sensor 4, a proximity sensor 5, a communication unit 6, receiver 7, a microphone 8, a storage 9, a controller 10, a speaker 11, a camera 12, a camera 13, a connector 4, an accelerometer 15, an azimuth sensor 16, a gyro sensor 17, a magnetic sensor 18, and an atmospheric pressure sensor 19.

The touchscreen display 2 has a display 2A and a touchscreen 2B. The display 2A and the touchscreen 2B may be located to overlap with each other, located side by side, or located separately from each other. If the display 2A and the touchscreen 2B are located to overlap with each other, one or a plurality of sides of the display 2A may not be located along any side of the touchscreen 2B.

The display 2A includes a display device of a liquid crystal display (LCD), an organic electro-luminescence display (OELD), or an inorganic electro-luminescence display (IELD), for example. The display 2A can display an object such as characters, images, symbols, and graphics, for example, in a screen. The screen including the object displayed in the display 2A includes a screen referred to as a lock screen, a screen referred to as a home screen, and an application screen displayed in executing an application. The home screen is referred to as a desktop, a standby screen, an idle screen, a standard screen, an application list screen, or a launcher screen in some cases.

The touchscreen 2B can detect a contact or proximity of a finger, a pen, or a stylus pen, for example, to the touchscreen 2B. The touchscreen 2B can detect a position on the touchscreen 2B which a plurality of fingers, a plurality of pens, or a plurality of stylus pens, for example, touch or get close to. In the description hereinafter, the position on the touchscreen 2B which the plurality of fingers, the plurality of pens, or the plurality of stylus pens, for example, touch or get close to detected by the touchscreen 2B is referred to as "the detection position". The touchscreen 2B notifies the controller 10 of the contact or proximity of the finger to the touchscreen 2B together with the detection position. The touchscreen 2B may notify the controller 10 of the detection of the contact or proximity by the notification of the detection position. The touchscreen display 2 comprising the touchscreen 2B can execute an operation which the touchscreen 2B can execute. In other words, it is deemed that the touchscreen display 2 performs an operation which the touchscreen 2B performs.

The controller 10 can determine a type of a gesture based on at least one of the contact or proximity, the detection position, or a change in the detection position, a duration time of the contact or proximity, an interval of the detection of the contact or proximity, and a total number of contacts. The smartphone 1 comprising the controller 10 can execute the operation which the controller 10 can execute. In other words, it is deemed that the smartphone 1 performs the operation performed by the controller 10. The gesture is an operation performed on the touchscreen 2B using the finger. The touchscreen display 2 comprising the touchscreen 2B may execute the operation performed on the touchscreen 2B. Examples of the gesture determined by the smartphone 1 via the touchscreen 2B include, but not only limited to, touch, long touch, release, swipe, tap, double tap, long tap, drag, flick, pinch-in, and pinch-out. A detection method of the touchscreen 2B may be any method, such as an electrostatic capacitance method, a resistance film method, a surface acoustic wave method, an infrared method, and a load detection method.

The button 3 can receive an operation being input by the user, One or a plurality of buttons 3 may be adopted. The button 3 is one example of the operation button.

The illuminance sensor 4 can detect illuminance. The illuminance is a value of a light flux entering a measurement surface of the illuminance sensor 4 per unit of area. The illuminance sensor 4 is used for adjusting luminance of the display 2A, for example.

The proximity sensor 5 can detect a presence of an object near the proximity sensor 5 in a non-contact manner. The proximity sensor 5 can detect the presence of the object based on a change in a magnetic field or a change in a returning time period of a reflected wave of an ultrasonic wave. The proximity sensor 5 detects a face getting close to the display 2A, for example. The illuminance sensor 4 and the proximity sensor 5 may be made up as one sensor. The illuminance sensor 4 may be used as the proximity sensor.

The communication unit 6 can perform a wireless communication. The wireless communication standards supported by the communication unit 6 include, for example, a communication standard for a cellular phone, such as 2G, 3G, 4G, and 5G, and a communication standard for short-range wireless communication. Examples of the communication standard for a cellular phone include Long Term Evolution (LTE), Wideband Code Division Multiple Access (W-CDMA), Worldwide Interoperability for Microwave Access (WiMAX) (trademark), CDMA2000, Personal Digital Cellular (PDC), Global System for Mobile Communications (GSM) (trademark), and Personal Handy-phone System (PHS). Examples of the communication standard for the short-range wireless communication include, for example, IEEE802.11, Bluetooth (trademark), Infrared Data Association (IrDA), Near Field Communication (NFC), and Wireless Personal Area Network (WPAN). Examples of the communication standard for WPAN include ZigBee (trademark). The communication unit 6 may support one or a plurality of the communication standards described above. In one embodiment, the communication unit 6 supports a communication standard for enabling a communication with a communication device mounted on the subject vehicle. The communication unit 6 further supports a communication standard for enabling a communication with a roadside unit provided near an intersection and a vehicle other than the subject vehicle (referred to as the non-subject vehicle hereinafter). The communication unit 6 is one example of a first communication unit and a second communication unit.

The receiver 7 can output a sound signal transmitted from the controller 10 as a sound. The receiver 7 can output a sound of a video and music reproduced by the smartphone 1 and a voice of an intended party during a voice communication, for example. The microphone 8 can convert, for example, a voice of the user being input to the microphone 8 into a sound signal and transmit the sound signal to the controller 10.

The storage 9 can store a program and data. The storage 9 may also be used as a workspace in which a processing result of the controller 10 is temporarily stored. The storage 9 may include any non-transitory storage medium such as a semiconductor storage medium and a magnetic storage medium. The storage 9 may include a plural types of storage media. The storage 9 may include a combination of a storage medium such as a memory card, an optical disc, and a magneto-optical disk and a reader for the storage medium. The storage 9 may include a storage device used as such as random access memory (RAM) that is used as a temporary storage area.

The program stored in the storage 9 includes an application executed in foreground or background and an assistance program assisting an operation of the application (the illustration is omitted). The application displays a screen relating to the application the display 2A when being executed in the foreground, for example. The assistance program includes OS, for example. The program may be installed in the storage 9 via the wireless communication performed by the communication unit 6 or via a non-transitory storage medium.

The storage 9 can store a control program 9A, acceleration data 9B, movement determination data 9C, communication system data 9D, and setting data 9Z, for example. The control program 9A can cooperate with various applications in providing various functions. The control program 9A may cooperate with a cloud storage via the communication unit 6 to access a file and data stored in the cloud storage. The cloud storage may store some or all of the programs and data stored in the storage 9.

The control program 9A can provide a function relating to the operation of the smartphone 1. In one example, the function provided by the control program 9A can achieve processing of transmitting information of a passenger of the subject vehicle to the non-subject vehicle or the roadside unit by a communication via the communication unit 6 if it is determined based on the communication via the communication unit 6 that a power engine of the subject vehicle is not activated. The control program 9A can determine that the power engine of the subject vehicle is not activated if a communication connection between a communication module mounted on an in-vehicle unit of the subject vehicle and a subject device is disconnected due to a suspension of the power engine of the subject vehicle. The information of the passenger of the subject vehicle includes a notification that there is the passenger in the vehicle. The power engine of the subject vehicle includes an engine (a prime mover) and a motor (an electrical motor). The state where the power engine of the subject vehicle is not activated includes a state where an engine (a prime mover) or a motor (an electrical motor) mounted on the subject vehicle is not driven, for example.

In one example, the function which can be provided by the control program 9A can also achieve the processing of transmitting the information of the passenger of the subject vehicle to the non-subject vehicle or the roadside unit via the communication unit 6 if it is determined that the power engine of the subject vehicle is not activated and the user of the subject device is not moving, based on the acceleration data 9B obtained by the accelerometer 15. The control program 9A can measure a vibration and movement acting on the subject device based on a direction and magnitude of an acceleration included in the acceleration data 9B. The control program 9A can determine whether the user of the subject device is moving by collating a measurement result of the measured vibration and movement with the moving determination data 9C. The control program 9A can select data, which is obtained by previously measuring the vibration and movement acting on the subject vehicle when the user of the subject device is moving, from the movement determination data 9C and use the data for the determination. The state where the user is moving includes walking and running, for example.

The acceleration data 9B includes a value of the acceleration obtained by the accelerometer 15. The acceleration data 9B includes a direction and magnitude of the acceleration obtained by the accelerometer 15. The acceleration data 9B may include all of the measurement results obtained by the accelerometer 15. The acceleration data 9B is one example of acceleration information.

The movement determination data 9C includes information of a determination condition used for determining a movement state of the user of the smartphone 1, for example. The information of the determination condition may include the direction and magnitude of the acceleration acting on the subject device, an acceleration pattern made up of a time series variation of the direction and magnitude of the acceleration, or a resultant vector constituted by synthesizing an acceleration in three axes of an X axis, a Y axis, and a Z axis. The movement determination data 9C includes a magnitude and direction of an acceleration, an acceleration pattern, and a resultant vector in a state where the user having the smartphone 1 walks and moves, for example. The movement determination data 9C further includes a magnitude and direction of an acceleration, an acceleration pattern, and a resultant vector in a state where the user having the smartphone 1 runs and moves, for example.

The communication system data 9D is information relating to a communication system of achieving a communication between the subject device and a roadside unit and a communication between the subject device and the non-subject vehicle. The communication system data 9D includes information of a frequency band used in a dedicated short range communication of an intelligent transport system, for example.

The setting data 9Z includes information of various settings regarding the operation of the smartphone 1.

The controller 10 comprises an arithmetic processing unit. The arithmetic processing unit includes at least one processor for providing control and processing capability to execute various functions as described in detail below. In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

The arithmetic processing unit in the present example includes, but not only limited to, a central processing unit (CPU), a system-on-a-chip (SoC), a micro control unit (MCU), a field-programmable gate array (FPGA), and a coprocessor, for example. The controller 10 integrally controls the operation of the smartphone 1 so as to achieve the various functions.

The controller 10 can execute a command included in a program stored in the storage 9 with reference to the data stored in the storage 9 as necessary. Then, the controller 10 controls a function unit in accordance with the data and the command, thereby achieving the various functions. The function unit includes, but not only limited to, the display 2A, the communication unit 6, the microphone 8, and the speaker 11, for example. The controller 10 may change the control in accordance with the detection result of a detector in some cases. The detector comprises, but not only limited to, the touchscreen 2B, the button 3, the illuminance sensor 4, the proximity sensor 5, the microphone 8, the camera 12, the camera 13, the accelerometer 15, the azimuth sensor 16, the gyro sensor 17, the magnetic sensor 18, and the atmospheric pressure sensor 19, for example.

The controller 10 executes the control program 9A, thereby being able to achieve each processing described below. The controller 10 can transmit the information of the passenger of the subject vehicle to the non-subject vehicle or the roadside unit by a communication via the communication unit 6 if it is determined based on the communication via the communication unit 6 that the power engine of the subject vehicle is not activated. The controller 10 can also transmit the information of the passenger of the subject vehicle to the non-subject vehicle or the roadside unit via the communication unit 6 if it is determined that the power engine of the subject vehicle is not activated and the user of the subject device is not moving, based on the acceleration data 9B obtained by the accelerometer 15.

The speaker 11 can output a sound signal transmitted from the controller 10 as a sound. The speaker 11 is used for outputting a ringtone and music, for example. One of the receiver 7 and the speaker 11 may double as the other's function. The camera 12 and the camera 13 can convert a taken image into an electrical signal. The camera 12 is an in-camera capable of taking an image of an object facing the display 2A. The camera 13 is an out-camera capable of taking an image of an object facing a surface opposite to the display 2A. The camera 12 and the camera 13 may be mounted on the smartphone 1 in a functionally and physically integrated state as a camera unit in which the in-camera and the out-camera can be switched in use.

The connector 14 is a terminal to which the other device is connected. The connector 14 may be a general terminal such as Universal Serial Bus (USB), High-Definition Multimedia Interface (HDMI) (trademark), Light Peak (Thunderbolt (trademark)), and an earphone-microphone connector. The connector 14 may be a dedicated terminal such as a dock connector. The device connected to the connector 14 comprises a communication module mounted on the in-vehicle unit of the subject vehicle, for example. Examples of the device to be connected to the connector 14 include, but not only limited to, an external storage, a speaker, and a communication device as well as the communication module mounted on the in-vehicle unit of the subject vehicle.

The accelerometer 15 can obtain the acceleration information acting on the smartphone 1. The acceleration information includes a direction and magnitude of the acceleration. The azimuth sensor 16 can detect a direction of geomagnetism and measure a direction (an azimuth) of the smartphone 1 based on the direction of the geomagnetism. The gyro sensor 17 can obtain rotational information of the smartphone 1. The rotational information includes an angular speed. The magnetic sensor 18 can detect a magnetic attraction around the smartphone 1. The atmospheric pressure sensor 19 can obtain atmospheric pressure information acting on the smartphone 1. The atmospheric pressure information includes an amount of pressure change per unit time. The amount of pressure change may be a value of an accumulation of an absolute value or a scalar quantity. An optional time may be set as the per unit time. The accelerometer 15, the azimuth sensor 16, the gyro sensor 17, the magnetic sensor 18, and the atmospheric pressure sensor 19 can output the obtained information or the measurement result to the controller 10.

The smartphone 1 may comprise a GPS receiver and a vibrator in addition to each function unit described above. The GPS receiver can receive radio signals having a predetermined frequency band from a GPS satellite. The GPS receiver can perform demodulation processing on the received radio signals, and can send out the processed signals to the controller 10. The GPS receiver can support arithmetic processing of a current position of the smartphone 1. The smartphone 1 may comprise a receiver which can receive signals of a positioning artificial satellite other than the GPS satellite to execute arithmetic processing of the current position. The vibrator vibrates a part of or the whole smartphone 1. The vibrator has, for example, a piezoelectric element or an eccentric motor to generate the vibration. The smartphone 1 comprises the function unit, such as a battery, naturally used to maintain the function of the smartphone 1 and a controller naturally used to achieve the control of the smartphone 1.

Figure 2:
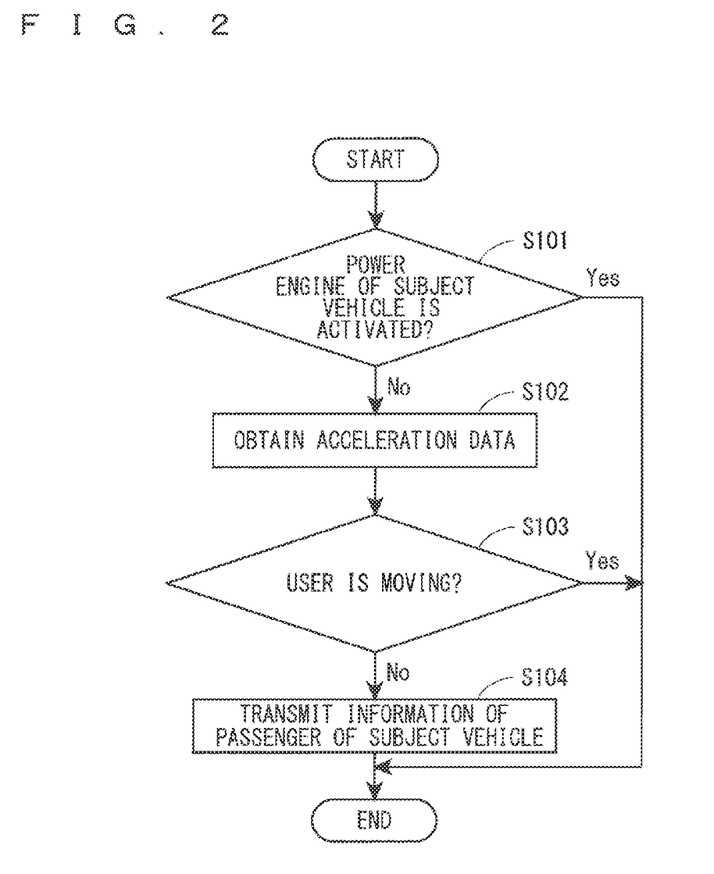
FIG. 2 is a flow chart illustrating one example of processing executed by the smartphone.

A flow of one example of the processing executed by the smartphone 1 is described using FIG. 2. FIG. 2 is a flow chart illustrating one example of the processing executed by the smartphone 1. The processing illustrated in FIG. 2 is achieved by the controller 10 executing the control program 9A stored in the storage 9. The processing illustrated in FIG. 2 is executed repeatedly when the smartphone 1 is in an operable state. The smartphone 1 may also execute the processing illustrated in FIG. 2 repeatedly when the smartphone 1 is in a mode of partially limiting a power supply control, that is a so-called power saving mode.

As illustrated in FIG. 2, the controller 10 determines whether or not the power engine of the subject vehicle is activated (Step S101).

If it is determined that the power engine of the subject vehicle is not activated as a result of the determination (No in Step S101), the controller 10 obtains the acceleration data 99 stored in the storage 9 (Step S102).

Subsequently, the controller 10 determines whether the user of the subject device is moving based on the acceleration data 913 (Step S103).

Figure 3:
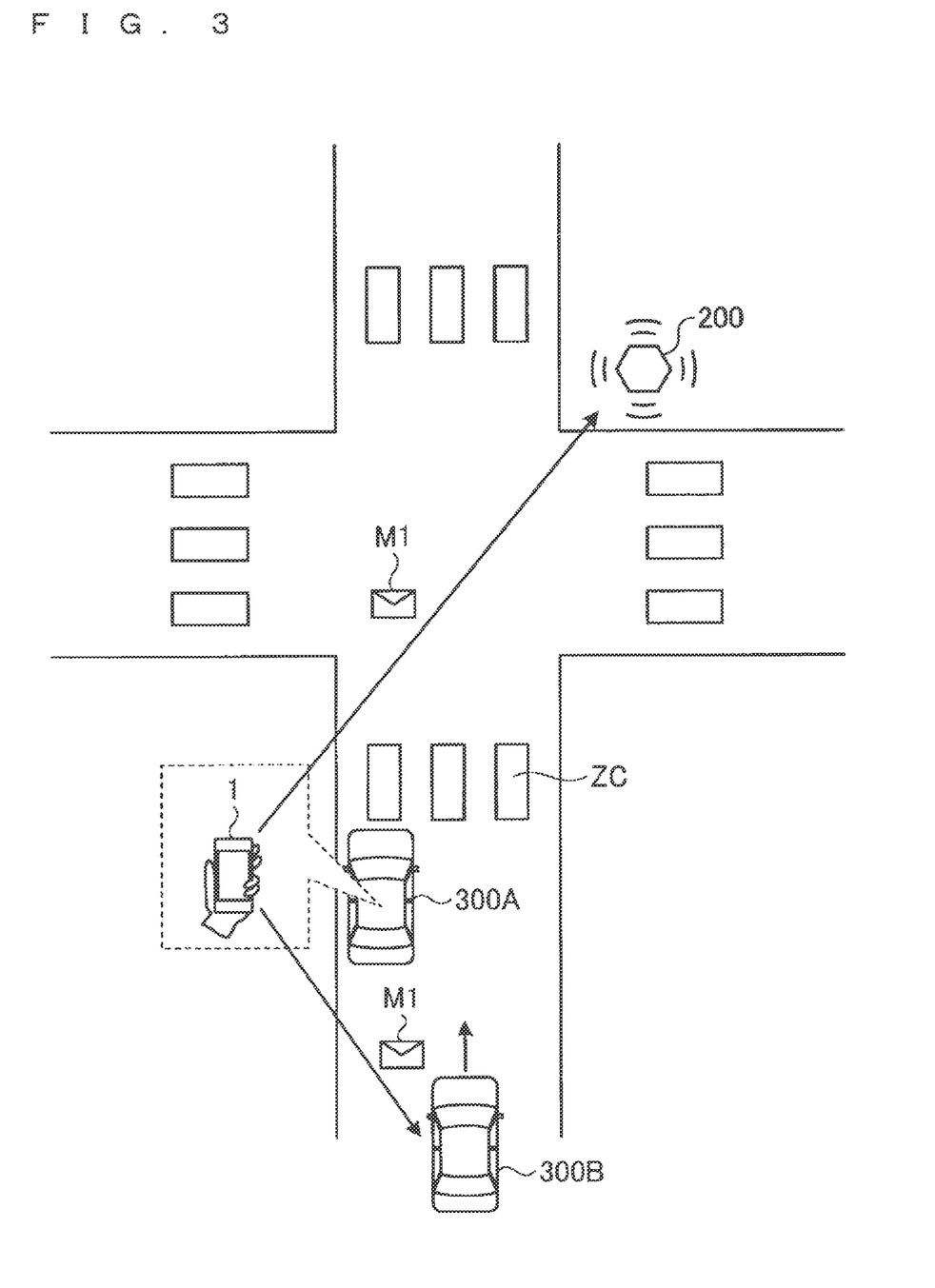
FIG. 3 is a diagram illustrating a summary of one example of the processing executed by the smartphone.

If it is determined that the user of the subject device is not moving as a result of the determination (No in Step S103), the controller 10 transmits the information of the passenger of the subject vehicle (Step S104), and finishes the processing illustrated in FIG. 2. FIG. 3 is a diagram illustrating a summary of the processing executed by the smartphone. As illustrated in FIG. 3, if it is determined that the power engine of a subject vehicle 300A stopping near a crosswalk ZC is not activated, the smartphone 1 transmits information M1 of a passenger of the subject vehicle 300A to a non-subject vehicle 300B or the roadside unit 200 by a communication via the communication unit 6. The non-subject vehicle 300B and the roadside unit 200 are located in a range where the dedicated short range communication of the intelligent transport system can be performed. The information M1 of the passenger of the subject vehicle 300A includes a notification that there is the passenger in the subject vehicle 300A.

When it is determined in Step S103 described above that the user of the subject device is moving as a result of the determination (Yes in Step S103), the controller 10 finishes the processing illustrated in FIG. 2.

When it is determined in Step S101 described above that the power engine of the subject vehicle is activated as a result of the determination (Yes in Step S101), the controller 10 finishes the processing illustrated in FIG. 2.

In the processing illustrated in FIG. 2 described above, the smartphone 1 needs not execute the processing corresponding to Step S102 described above and Step S103 described above. That is to say, the smartphone 1 may transmit the information of the passenger of the subject vehicle on an occasion of the determination that the power engine of the subject vehicle is not activated.

The smartphone 1 may determine a state where an engine mounted on the subject vehicle is driven but does not convey power to the subject vehicle (referred to as an idling state) as a state where the power engine of the subject vehicle is not activated. The smartphone 1 determines whether the subject vehicle is in the idling state based on the acceleration data 9B when the communication with the subject vehicle is connected, for example. If it is determined that the subject vehicle is in the idling state as a result of the determination, the smartphone 1 subsequently determines whether the user is moving. If it is determined that the user is not moving as a result of the determination, the smartphone 1 may determine that the user of the subject device is on the subject vehicle which is parked or stopping, and transmit the information of the passenger of the subject vehicle.

If the smartphone 1 determines whether the user is moving on the occasion of the determination that the power engine of the subject vehicle is not activated, the smartphone 1 may count a total number of steps of the user based on the acceleration data 9B, for example. If the number of steps of the user does not exceed a certain number, the smartphone 1 may determine that the user is on the subject vehicle or near the subject vehicle, and transmit the information of the passenger of the subject vehicle.

If it is determined that the power engine of the subject vehicle is not active and the user is moving, the smartphone 1 may transmit the notification that the user gets out of the subject vehicle. The smartphone 1 in this case is described hereinafter.

The function which can be provided by the control program 9A can achieve the processing of transmitting the notification that the user gets out of the subject vehicle to the non-subject vehicle or the roadside unit via the communication unit 6 if it is determined that the power engine of the subject vehicle is not activated and the user of the subject vehicle is moving based on the acceleration data 9B.

The controller 10 can transmit the notification that the user gets out of the subject vehicle to the non-subject vehicle or the roadside unit via the communication unit 6 if the controller 10 executes the control program 9A, thereby determining that the power engine of the subject vehicle is not activated and the user of the subject vehicle is moving based on the acceleration data 9B.

Figure 4:
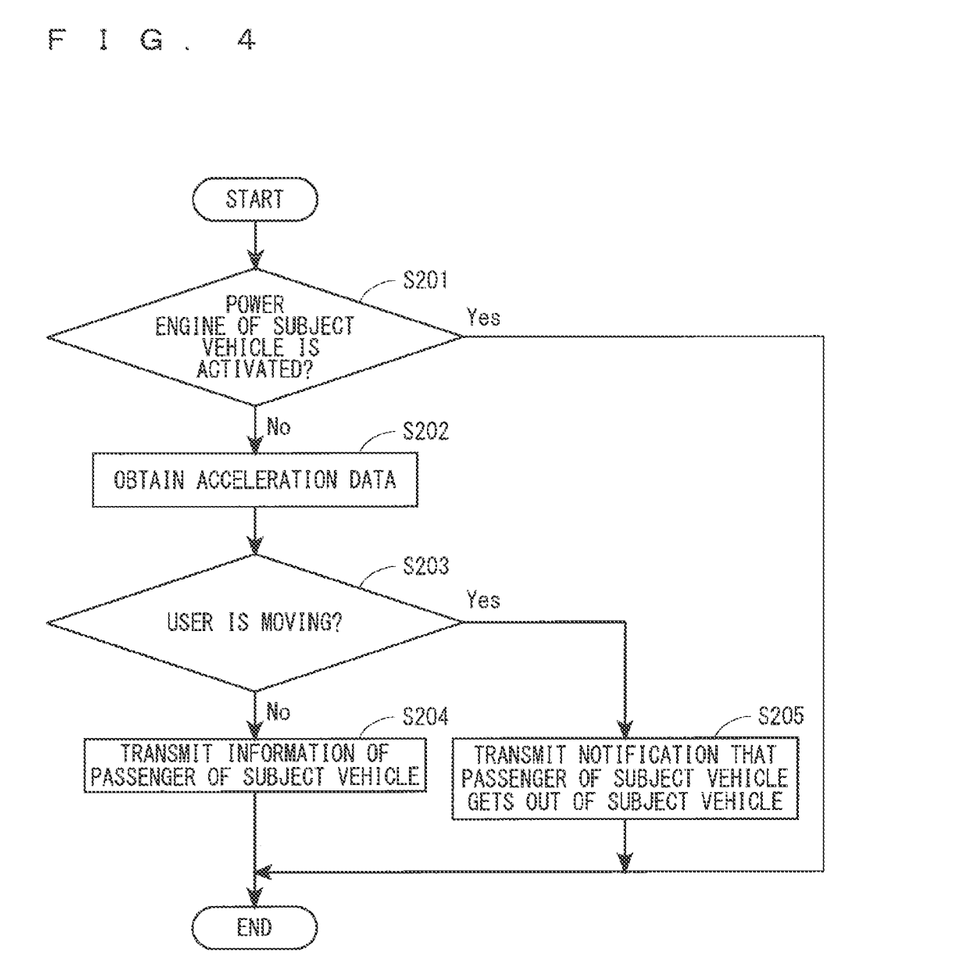
FIG. 4 is a flow chart illustrating one example of processing executed by the smartphone.

FIG. 4 is a flow chart illustrating one example of the processing executed by the smartphone 1. The processing illustrated in FIG. 4 is achieved by the controller 10 executing the control program 9A stored in the storage 9. The processing illustrated in FIG. 4 is different from the processing illustrated in FIG. 2 described above in that the processing illustrated in FIG. 4 includes Step S205.

As illustrated in FIG. 4, the controller 10 determines whether or not the power engine of the subject vehicle is activated (Step S201).

If it is determined that the power engine of the subject vehicle is not activated as a result of the determination (No in Step S201), the controller 10 obtains the acceleration data 99 stored in the storage 9 (Step S202).

Subsequently, the controller 10 determines whether the user of the subject device is moving based on the acceleration data 913 (Step S203).

If it is determined that the user of the subject device is not moving as a result of the determination (No in Step S203), the controller 10 transmits the information of the passenger of the subject vehicle (Step S204), and finishes the processing illustrated in FIG. 4.

in the meanwhile, if it is determined that the user of the subject device is moving as a result of the determination (Yes in Step S203), the controller 10 transmits the notification that the passenger of the subject vehicle gets out of the subject vehicle (Step S205), and finishes the processing illustrated in FIG. 4.

When it is determined in Step S201 described above that the power engine of the subject vehicle is activated as a result of the determination (Yes in Step S201), the controller 10 finishes the processing illustrated in FIG. 4.

If a terminal of the user on the subject vehicle is connected to an in-vehicle network built on the subject vehicle or a communication module mounted on the in-vehicle unit of the subject vehicle, the smartphone 1 may obtain the information of the terminal of the user on the subject vehicle. At this time, if the smartphone 1 transmits the information of the passenger of the subject vehicle, the smartphone 1 can transmit the information of the other passenger together.

Figure 5:
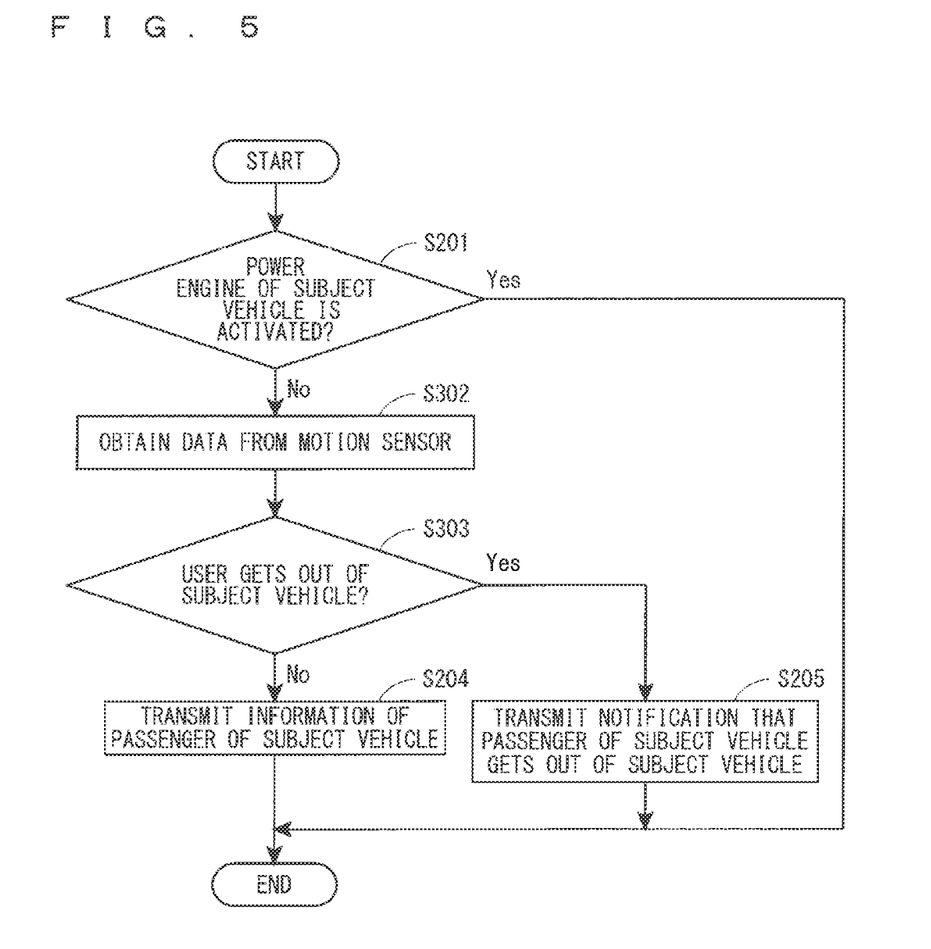
FIG. 5 is a flow chart illustrating one example of the processing executed by the smartphone.

The smartphone 1 may comprise a motion sensor which can detect a specific behavior of the user of the subject device. At this time, the smartphone 1 may determine whether a behavior of the user opening a door of the subject vehicle to go outside the subject vehicle, that is to say, a behavior of the user getting out of the subject vehicle is detected based on a detection result of the motion sensor instead of the determination whether the user is moving on the occasion of the determination that the power engine of the subject vehicle is not activated. If it is determined that the behavior of the user going outside the subject vehicle is not detected, the smartphone 1 can transmit the information of the passenger of the subject vehicle to the non-subject vehicle or the roadside unit. If it is determined that the behavior of the user going outside the subject vehicle is detected, the smartphone 1 can transmit the notification that the passenger of the subject vehicle gets out of the subject vehicle to the non-subject vehicle or the roadside unit. FIG. 5 is a flow chart illustrating the operation of the smartphone 1 in this case. Steps S302 and S303 are executed in the flow chart illustrated in FIG. 5 instead of Steps S202 and S203 in the case of the flow chart illustrated in FIG. 4. In Step S302, the controller 10 obtains data indicating the detection result from the motion sensor. Subsequently, in Step S303, the controller 10 determines whether the controller detects the behavior of the user getting out of the subject vehicle based on the obtained data. If the controller 10 detects the behavior of the user getting out of the subject vehicle, the controller 10 executes Step S205 and transmits the notification that the passenger of the subject vehicle gets out of the subject vehicle via the communication unit 6. In the meanwhile, if the controller 10 does not detect the behavior of the user getting out of the subject vehicle, the controller 10 executes Step S204 and transmits the information of the passenger of the subject vehicle via the communication unit 6.

If the subject vehicle is in the idling state and the communication with the subject vehicle is still not disconnected, the smartphone 1 may determine whether a direction indicator of the subject vehicle is lighted instead of determining whether the user is moving. The smartphone 1 obtains the information of the direction indicator from the subject vehicle, and if the direction indicator is lighted, the smartphone 1 can determine that the user of the subject device is on the subject vehicle which is parked or stopping, and can transmit the information of the passenger of the subject vehicle to the non-subject vehicle or the roadside unit. Alternatively, if the direction indicator is lighted, the smartphone 1 may further determine whether the behavior of the user opening the door of the subject vehicle to go outside the subject vehicle is detected based on the detection result of the motion sensor, for example. If the direction indicator is lighted and the behavior of the user going outside the vehicle is not detected, the smartphone 1 can determine that the user of the subject device is on the subject vehicle which is parked or stopping, and can transmit the information of the passenger of the subject vehicle to the non-subject vehicle or the roadside unit.

In the present specification, the art of appended claims has been described with respect to specific embodiments for a complete and clear disclosure. However, the appended claims are not to be thus limited but are to be construed as embodying all modifications and alternative constructions that may occur to one skilled in the art which fairly fall within the basic teaching described in the present specification.

Then invention claimed is:
1. An electronic device included in a first vehicle, comprising:
a first communication unit configured to communicate with a second vehicle, other than the first vehicle, or a roadside unit;

a second communication unit configured to communicate with the first vehicle; and at least one processor configured to determine that a power engine of the first vehicle is not activated based on a communication via the second communication unit, and transmit first information of a passenger of the first vehicle to the second vehicle or to the roadside unit by a communication via the first communication unit, and wherein one of the following:

if the at least one processor determines that the power engine is not activated, and detects a behavior of the passenger getting out of the first vehicle based on sensor information obtained from at least one sensor, the at least one processor transmits second information to the second vehicle or the roadside unit via the first communication unit, the second information indicating that the passenger gets out of the first vehicle, and if the at least one processor determines that the power engine is idling based on a communication via the second communication unit, the at least one processor transmits a notification to the second vehicle or the roadside unit via the first communication unit, the notification indicating that the passenger gets out of the first vehicle.

2. The electronic device according to claim 1, wherein if the at least one processor determines that the power engine is not activated, and determines that the passenger is not moving based on the sensor information, the at least one processor configured to transmit the first information to the second vehicle or the roadside unit via the first communication unit.

3. The electronic device according to claim 1, wherein if the at least one processor determines that the power engine is not activated, and determines that the passenger is moving based on the sensor information, the at least one processor transmits a notification to the second vehicle or the roadside unit via the first communication unit, the notification indicating that the passenger gets out of the first vehicle.

4. The electronic device according to claim 2, wherein if the at least one processor determines that the power engine is not activated and determines that the passenger is moving based on the sensor information, the at least one processor transmits a notification to the second vehicle or the roadside unit via the first communication unit, the notification indicating that the passenger gets out of the first vehicle.

5. The electronic device according to claim 1, wherein if the at least one processor determines that the power engine is not activated, and detects the behavior of the passenger getting out of the first vehicle based on the sensor information, the at least one processor transmits second information to the second vehicle or the roadside unit via the first communication unit, the second information indicating that the passenger gets out of the first vehicle.

6. The electronic device according to claim 1, wherein if the at least one processor determines that the power engine is idling based on the communication via the second communication unit, the at least one processor transmits the notification to the second vehicle or the roadside unit via the first communication unit, the notification indicating that the passenger gets out of the first vehicle.

7. An electronic device included in a first vehicle, comprising:

a first communication unit configured to communicate with a second vehicle, other than the first vehicle, or a roadside unit a second communication unit configured to communicate with the first vehicle; and at least one processor configured to determine that a power engine of the first vehicle is not activated based on a communication via the second communication unit, and transmit first information of a passenger of the first vehicle to the second vehicle or to the roadside unit by a communication via the first communication unit, wherein if the at least one processor determines that the power engine is idling, and a direction indicator of the first vehicle is lighted, based on a determination of a communication via the second communication unit, the at least one processor transmits the first information to the second vehicle or the roadside unit via the first communication unit.

8. The electronic device according to claim 7, comprising at least one sensor configured to obtain sensor information, wherein if the at least one processor determines that the power engine is idling, and the direction indicator is lighted, the at least one processor determines whether the passenger gets out of the first vehicle based on the sensor information, and if the passenger does not get out of the first vehicle, the at least one processor transmits the first information to the second vehicle or the roadside unit via the first communication unit.

9. A non-transitory computer readable storage medium that stores a control program of making an electronic device having a first communication unit being included in a first vehicle and communicating with a second vehicle other than the first vehicle or a roadside unit and a second communication unit communicating with the first vehicle execute:

determining whether a power engine of the first vehicle is activated based on a communication via the second communication unit;

if it is determined that the power engine is not activated, transmitting information of a passenger of the first vehicle to the second vehicle or the roadside unit by a communication via the first communication unit; and one of the following:

if it is determined that the power engine is not activated, and a behavior of the passenger getting out of the first vehicle based on sensor information obtained from at least one sensor is detected, transmitting second information to the second vehicle or the roadside unit via the first communication unit, the second information indicating that the passenger gets out of the first vehicle, and if it is determined that the power engine is idling based on a communication via the second communication unit, transmitting a notification to the second vehicle or the roadside unit via the first communication unit, the notification indicating that the passenger gets out of the first vehicle.

* * * * *